US007751804B2

(12) United States Patent
Steelberg et al.

(10) Patent No.: US 7,751,804 B2
(45) Date of Patent: Jul. 6, 2010

(54) DYNAMIC CREATION, SELECTION, AND SCHEDULING OF RADIO FREQUENCY COMMUNICATIONS

(75) Inventors: Ryan Steelberg, Newport Beach, CA (US); Chad Steelberg, Newport Beach, CA (US)

(73) Assignee: Wideorbit, Inc., San Francisco, CA (US)

( * ) Notice: Subject to any disclaimer, the term of this patent is extended or adjusted under 35 U.S.C. 154(b) by 0 days.

(21) Appl. No.: 10/898,011

(22) Filed: Jul. 23, 2004

(65) Prior Publication Data

US 2006/0019642 A1 Jan. 26, 2006

(51) Int. Cl.
*H04M 3/42* (2006.01)

(52) U.S. Cl. ................. 455/414.2; 455/422.1; 455/418; 455/419; 455/3.01; 455/3.04; 455/63.3; 455/517; 455/67.7

(58) Field of Classification Search .................. 455/77, 455/150.1, 503, 552, 557, 414.1, 466, 3.06, 455/427, 575, 2.01, 3.01, 3.03, 456.3; 705/26, 705/27; 725/62, 109, 112, 110, 205, 39
See application file for complete search history.

(56) References Cited

U.S. PATENT DOCUMENTS

| | | | |
|---|---|---|---|
| 4,517,562 | A | 5/1985 | Martinez |
| 4,665,514 | A | 5/1987 | Ching et al. |
| 4,723,285 | A | 2/1988 | LeRoy et al. |
| 4,841,357 | A | 6/1989 | Gillies |
| 4,864,620 | A | 9/1989 | Bialick |
| 5,096,195 | A | 3/1992 | Gimmon |
| 5,129,036 | A | 7/1992 | Dean et al. |
| 5,260,778 | A | 11/1993 | Kauffman et al. |
| 5,303,326 | A | 4/1994 | Dean et al. |
| 5,440,351 | A | 8/1995 | Ichino |
| 5,515,098 | A | 5/1996 | Carles |
| 5,557,541 | A | 9/1996 | Schulhof et al. |
| 5,576,755 | A | 11/1996 | Davis et al. |
| 5,697,844 | A | 12/1997 | Von Kohorn |

(Continued)

FOREIGN PATENT DOCUMENTS

| | | | |
|---|---|---|---|
| CN | 1285079 | A | 2/2001 |

(Continued)

OTHER PUBLICATIONS

"By Using Multicast, Wireless Communication, New Information Can Be Distributed," Nikkei Internet Technology, Sep. 22, 1997, pp. 106-111, vol. 3.

(Continued)

*Primary Examiner*—Patrick N Edouard
*Assistant Examiner*—Julio Perez
(74) *Attorney, Agent, or Firm*—Wilson Sonsini Goodrich & Rosati

(57) ABSTRACT

A method of developing a visual/audio campaign for delivery to a device having a radio wave receiver is disclosed. The method includes a managing node receiving broadcast specific information from a plurality of radio stations, the managing node receiving broadcast non-specific information, the managing node creating the visual/audio campaign at least partly by matching an item of broadcast non-specific information with an item of broadcast specific information, and delivering the visual/audio campaign to the device via radio waves.

23 Claims, 2 Drawing Sheets

U.S. PATENT DOCUMENTS

| | | | | |
|---|---|---|---|---|
| 5,715,018 | A | 2/1998 | Fasciano et al. | |
| 5,724,521 | A | 3/1998 | Dedrick | |
| 5,738,583 | A | 4/1998 | Comas et al. | |
| 5,948,061 | A | 9/1999 | Merriman et al. | |
| 5,999,808 | A | 12/1999 | LaDue | |
| 6,011,973 | A | 1/2000 | Valentine et al. | |
| 6,104,815 | A | 8/2000 | Alcorn et al. | |
| 6,167,382 | A | 12/2000 | Sparks et al. | |
| 6,198,906 | B1 | 3/2001 | Boetje et al. | |
| 6,212,392 | B1 | 4/2001 | Fitch et al. | |
| 6,256,508 | B1 | 7/2001 | Nakagawa et al. | |
| 6,260,047 | B1 | 7/2001 | Fox et al. | |
| 6,282,548 | B1 | 8/2001 | Burner et al. | |
| 6,286,005 | B1 | 9/2001 | Cannon | |
| 6,298,218 | B1 | 10/2001 | Lowe et al. | |
| 6,311,214 | B1 | 10/2001 | Rhoads | |
| 6,317,784 | B1 * | 11/2001 | Mackintosh et al. | 709/219 |
| 6,338,043 | B1 | 1/2002 | Miller | |
| 6,374,177 | B1 | 4/2002 | Lee et al. | |
| 6,388,712 | B1 | 5/2002 | Shinohara et al. | |
| 6,401,075 | B1 | 6/2002 | Mason et al. | |
| 6,411,992 | B1 | 6/2002 | Srinivasan et al. | |
| 6,416,414 | B1 | 7/2002 | Stadelmann | |
| 6,470,180 | B1 | 10/2002 | Kotzin et al. | |
| 6,502,076 | B1 | 12/2002 | Smith | |
| 6,508,710 | B1 | 1/2003 | Paravia et al. | |
| 6,509,867 | B1 | 1/2003 | McGibney | |
| 6,527,638 | B1 | 3/2003 | Walker et al. | |
| 6,527,641 | B1 | 3/2003 | Sinclair et al. | |
| 6,606,745 | B2 | 8/2003 | Maggio | |
| 6,628,928 | B1 * | 9/2003 | Crosby et al. | 455/77 |
| 6,628,939 | B2 | 9/2003 | Paulsen | |
| 6,650,892 | B1 | 11/2003 | Thiriet | |
| 6,674,995 | B1 | 1/2004 | Meyers et al. | |
| 6,678,501 | B1 * | 1/2004 | Valeski | 455/3.04 |
| 6,701,355 | B1 | 3/2004 | Brandt et al. | |
| 6,711,474 | B1 | 3/2004 | Treyz et al. | |
| 6,725,022 | B1 | 4/2004 | Clayton et al. | |
| 6,735,435 | B2 | 5/2004 | Newell et al. | |
| 6,747,760 | B2 | 6/2004 | Geddes et al. | |
| 6,767,284 | B1 | 7/2004 | Koza | |
| 6,778,820 | B2 | 8/2004 | Tendler | |
| 6,820,055 | B2 | 11/2004 | Saindon et al. | |
| 6,820,277 | B1 | 11/2004 | Eldering et al. | |
| 6,829,475 | B1 | 12/2004 | Lee et al. | |
| 6,850,839 | B1 | 2/2005 | McGibney | |
| 6,895,238 | B2 | 5/2005 | Newell et al. | |
| 6,915,107 | B1 | 7/2005 | Lusk | |
| 6,941,324 | B2 | 9/2005 | Plastina et al. | |
| 6,952,559 | B2 | 10/2005 | Bates et al. | |
| 6,957,041 | B2 * | 10/2005 | Christensen et al. | 455/3.06 |
| 6,961,549 | B2 | 11/2005 | Mori | |
| 6,963,910 | B1 | 11/2005 | Belknap et al. | |
| 6,975,835 | B1 * | 12/2005 | Lake et al. | 455/3.01 |
| 6,985,882 | B1 | 1/2006 | Del Sesto | |
| 7,036,136 | B1 * | 4/2006 | Worthy | 725/15 |
| 7,039,930 | B1 | 5/2006 | Goodman et al. | |
| 7,054,592 | B2 * | 5/2006 | Tatsumi et al. | 455/3.06 |
| 7,069,582 | B2 | 6/2006 | Philyaw et al. | |
| 7,085,732 | B2 | 8/2006 | Gould | |
| 7,158,753 | B2 * | 1/2007 | Kagan et al. | 455/3.04 |
| 7,167,454 | B2 | 1/2007 | Caldwell et al. | |
| 7,349,663 | B1 | 3/2008 | Joseph | |
| 2001/0003099 | A1 | 6/2001 | Von Kohorn | |
| 2001/0018858 | A1 | 9/2001 | Dwek | |
| 2001/0037304 | A1 | 11/2001 | Paiz | |
| 2001/0048748 | A1 | 12/2001 | Van Ryzin | |
| 2001/0051559 | A1 | 12/2001 | Cohen et al. | |
| 2002/0023020 | A1 | 2/2002 | Kenyon et al. | |
| 2002/0038455 | A1 | 3/2002 | Srinivasan et al. | |
| 2002/0049037 | A1 | 4/2002 | Christensen et al. | |
| 2002/0056118 | A1 | 5/2002 | Hunter et al. | |
| 2002/0059646 | A1 | 5/2002 | Kim | |
| 2002/0069404 | A1 | 6/2002 | Copeman et al. | |
| 2002/0092019 | A1 | 7/2002 | Marcus | |
| 2002/0099600 | A1 | 7/2002 | Merriman et al. | |
| 2002/0122052 | A1 | 9/2002 | Reich et al. | |
| 2002/0133820 | A1 | 9/2002 | Arai et al. | |
| 2002/0168967 | A1 | 11/2002 | Clapper | |
| 2002/0178058 | A1 | 11/2002 | Ritchie et al. | |
| 2002/0194215 | A1 | 12/2002 | Cantrell et al. | |
| 2003/0003990 | A1 | 1/2003 | Von Kohorn | |
| 2003/0009452 | A1 | 1/2003 | O'Rourke et al. | |
| 2003/0023489 | A1 | 1/2003 | McGuire et al. | |
| 2003/0045273 | A1 | 3/2003 | Pyhalammi et al. | |
| 2003/0069032 | A1 * | 4/2003 | Jarvi et al. | 455/466 |
| 2003/0070167 | A1 | 4/2003 | Holtz et al. | |
| 2003/0093530 | A1 | 5/2003 | Syed | |
| 2003/0105809 | A1 | 6/2003 | Yoshii et al. | |
| 2003/0119528 | A1 | 6/2003 | Pew et al. | |
| 2003/0126616 | A1 | 7/2003 | Dewa | |
| 2003/0139190 | A1 | 7/2003 | Steelberg et al. | |
| 2003/0229559 | A1 | 12/2003 | Panttaja et al. | |
| 2004/0024633 | A1 | 2/2004 | Whymark | |
| 2004/0028388 | A1 | 2/2004 | Kataoka et al. | |
| 2004/0038723 | A1 | 2/2004 | Schneier et al. | |
| 2004/0064524 | A1 * | 4/2004 | Van Steenbergen et al. | 709/217 |
| 2004/0087326 | A1 | 5/2004 | Dunko et al. | |
| 2004/0093394 | A1 | 5/2004 | Weber et al. | |
| 2004/0103026 | A1 | 5/2004 | White | |
| 2004/0117826 | A1 | 6/2004 | Karaoguz et al. | |
| 2004/0127199 | A1 * | 7/2004 | Kagan et al. | 455/414.1 |
| 2004/0198217 | A1 * | 10/2004 | Lee et al. | 455/3.01 |
| 2004/0215515 | A1 | 10/2004 | Perry | |
| 2004/0236864 | A1 | 11/2004 | Stevenson et al. | |
| 2004/0244042 | A1 * | 12/2004 | Billmaier | 725/110 |
| 2005/0015800 | A1 | 1/2005 | Holcomb | |
| 2005/0020238 | A1 * | 1/2005 | Eastman et al. | 455/403 |
| 2005/0021396 | A1 | 1/2005 | Pearch et al. | |
| 2005/0039206 | A1 | 2/2005 | Opdycke et al. | |
| 2005/0043020 | A1 * | 2/2005 | Lipsanen et al. | 455/422.1 |
| 2005/0065806 | A1 | 3/2005 | Harik | |
| 2005/0065844 | A1 | 3/2005 | Raj et al. | |
| 2005/0090279 | A9 * | 4/2005 | Witkowski et al. | 455/550.1 |
| 2005/0105725 | A1 | 5/2005 | Lee | |
| 2005/0137958 | A1 | 6/2005 | Huber et al. | |
| 2005/0198317 | A1 * | 9/2005 | Byers | 709/228 |
| 2005/0227678 | A1 | 10/2005 | Agrawal et al. | |
| 2005/0239402 | A1 * | 10/2005 | Gioscia et al. | 455/3.06 |
| 2005/0267817 | A1 * | 12/2005 | Barton et al. | 705/26 |
| 2005/0278769 | A1 | 12/2005 | Steelberg et al. | |
| 2006/0133407 | A1 | 6/2006 | Kuisma | |
| 2006/0143236 | A1 | 6/2006 | Wu | |
| 2006/0146765 | A1 | 7/2006 | Van de Sluis et al. | |
| 2006/0176374 | A1 | 8/2006 | Oklejas | |
| 2006/0195863 | A1 | 8/2006 | Whymark | |
| 2006/0212901 | A1 | 9/2006 | Steelberg et al. | |
| 2006/0218401 | A1 | 9/2006 | Jun | |
| 2006/0248209 | A1 | 11/2006 | Chiu et al. | |
| 2006/0268667 | A1 | 11/2006 | Jellison, Jr. et al. | |
| 2006/0282533 | A1 | 12/2006 | Steelberg et al. | |
| 2006/0294571 | A1 | 12/2006 | Moore et al. | |
| 2007/0022459 | A1 | 1/2007 | Gaebel et al. | |
| 2007/0027958 | A1 | 2/2007 | Haslam | |
| 2007/0078712 | A1 | 4/2007 | Ott et al. | |
| 2007/0078714 | A1 | 4/2007 | Ott et al. | |
| 2007/0094042 | A1 | 4/2007 | Ramer et al. | |
| 2007/0157261 | A1 | 7/2007 | Steelberg et al. | |
| 2007/0250856 | A1 | 10/2007 | Leavens et al. | |
| 2007/0259318 | A1 | 11/2007 | Harrison | |
| 2008/0021710 | A1 | 1/2008 | Ho | |
| 2008/0077264 | A1 | 3/2008 | Irvin et al. | |
| 2008/0208378 | A1 | 8/2008 | Booth et al. | |
| 2008/0249982 | A1 | 10/2008 | Lakowske | |

| | | | |
|---|---|---|---|
| 2008/0253307 | A1 | 10/2008 | Irvin |
| 2008/0254741 | A1 | 10/2008 | Irvin |
| 2008/0255686 | A1 | 10/2008 | Irvin et al. |
| 2008/0256080 | A1 | 10/2008 | Irvin et al. |
| 2008/0256109 | A1 | 10/2008 | Irvin et al. |
| 2009/0019374 | A1 | 1/2009 | Logan et al. |

FOREIGN PATENT DOCUMENTS

| | | | |
|---|---|---|---|
| EP | 1 032 148 | A2 | 8/2000 |
| JP | 03-184486 | | 8/1991 |
| JP | 05-284162 | | 10/1993 |
| JP | 07-505028 | | 6/1995 |
| JP | 09-018430 | | 1/1997 |
| JP | 2000-244427 | | 9/2000 |
| JP | 2002-368704 | | 12/2002 |
| KR | 10-1997-0019597 | | 4/1997 |
| KR | 10-201-0112410 | | 12/2001 |
| WO | WO 93/15466 | | 8/1993 |
| WO | WO 97/21183 | A1 | 6/1997 |
| WO | WO 99/33076 | | 7/1999 |
| WO | WO 99/49663 | | 9/1999 |
| WO | WO 01/35667 | A1 | 5/2001 |
| WO | WO 02/01869 | A1 | 1/2002 |
| WO | WO 02/25467 | A1 | 3/2002 |
| WO | WO 02/27425 | A2 | 4/2002 |
| WO | WO 02/27425 | A3 | 5/2003 |
| WO | WO 2004/017163 | A2 | 2/2004 |
| WO | WO 2004/017163 | A3 | 11/2004 |

OTHER PUBLICATIONS

"Eonstreams, Inc. Secures Financing to Deploy Revolutionary Ad Insertion Capability," Source Eonstreams, Inc., Mar. 29, 2005, 2 Pages, [online] [retrieved on Apr. 8, 2005] Retrieved from the Internet <URL: http://www.prnewswire.com/cgi-bin/stories.pl?ACCT=104 &STORY=/www/story/03-29-2005/0003288...>.

"Eonstreams, Advertise with us!," Eonstreams, Inc., 2006, 1 page, [online] [retrieved on Apr. 28, 2006] Retrieved from the Internet: <URL: http://www.eonstreams.com/Advertisers.htm>.

"Eonstreams, advertising . . . ," Eonstreams, Inc., 2004, 1 page, [online] [retrieved on Apr. 7, 2005] Retrieved from the Internet <URL: http://www.eonstreams.com/ServicesAdv.htm>.

"Eonstreams, be on eon!," Eonstreams, Inc., 2004, 1 page, [online] [retrieved on Apr. 7, 2005] Retrieved from the Internet: <URL: http://www.eonstreams.com/>.

"Eonstreams, Better together . . . ," Eonstreams, Inc., 2006, 1 page, [online] [retrieved on May 22, 2006] Retrieved from the Internet: <URL: http://www.eonstreams.com/>.

"Eonstreams, case studies . . . ," Eonstreams. Inc., 2004, 2 pages, [online] [retrieved on Apr. 7, 2005] Retrieved from the Internet: <URL: http://www.eonstreams.com/SamplesCase.htm>.

"Eonstreams, clients love us . . . ," Eonstreams, Inc., 2004, 1 page, [online] [retrieved on Apr. 7, 2005] Retrieved from the Internet: <URL: http://www.eonstreams.com/Testimonials.htm>.

"Eonstreams, FAQs," Eonstreams, Inc., Mar. 3, 2006, 7 pages, [online] [retrieved on Apr. 28, 2006] Retrieved from the Internet: <URL: http://www.eonstreams.com/HowToFaqs.htm>.

"Eonstreams, Kevin Woods, CTO," Eonstreams, Inc., 2004, 1 page, [online] [retrieved on Apr. 7, 2005] Retrieved from the Internet <URL: http://www.eonstreams.com/CoInfoCTO.htm>.

"Eonstreams, pay-per-view . . . ," Eonstreams, Inc., 2004, 1 page, [online] [retrieved on Apr. 7, 2005] Retrieved from the Internet: <URL: http://www.eonstreams.com/ServicesPPV.htm>.

"Eonstreams, Press releases . . . ," Eonstreams, Inc., Feb. 2, 2006, 6 pages, [online] [retrieved on Apr. 28, 2006] Retrieved from the Internet: <URL: http://www.eonstreams.com/PressReleases.htm>.

"Eonstreams, Steve Newman, CEO," Eonstreams, Inc., 2004, 1 page, [online] [retrieved on Apr. 7, 2005] Retrieved from the Internet: <URL: http://www.eonstreams.com/CoInfoCEO.htm>.

"Eonstreams, streaming . . . ," Eonstreams, Inc., 2004, 1 page, [online] [retrieved on Apr. 7, 2005] Retrieved from the Internet: <URL: http://www.eonstreams.com/ServicesStreaming.htm>.

"Eonstreams, Streaming . . . ," Eonstreams, Inc., 2006, 1 page, [online] [retrieved on Apr. 28, 2006] Retrieved from the Internet: <URL: http://www.eonstreams.com/Streaming.htm>.

"Eonstreams, subscription . . . ," Eonstreams, Inc., 2004, 1 page, [online] [retrieved on Apr. 7, 2005] Retrieved from the Internet <URL: http://www.eonstreams.com/ServicesSub.htm>.

"Eonstreams, Susan Seagraves, CFO," Eonstreams, Inc., 2004, 1 page, [online] [retrieved on Apr. 7, 2005] Retrieved from the Internet <URL: http://www.eonstreams.com/CoInfoCFO.htm>.

"Eonstreams, testimonials, 650WSM Nashville's Country Legendl, WSM | Citadel Broadcasting Corporation," Eonstreams, Inc., 2004, 1 page, [online] [retrieved on Apr. 7, 2005] Retrieved from the Internet: <URL: http://www.eonstreams.com/TestimonialsWSM.htm>.

"Eonstreams, testimonials, Citadel Communications Corporation, WSM | Citadel Broadcasting Corporation," Eonstreams, Inc., 2004, 2 pages, [online] [retrieved on Apr. 7, 2005] Retrieved from the Internet: <URL: http://www.eonstreams.com/TestimonialsCitadelhtm>.

"Eonstreams, Tools . . . ," Eonstreams, Inc., 2006, 1 page, [online] [retrieved on Apr. 28, 2006] Retrieved from the Internet: <URL: http://www.eonstreams.com/How_To_Tools.htm>.

"Eonstreams, total solutions . . . ," Eonstreams. Inc., 2004, 1 page, [online] [retrieved on Apr. 7, 2005] Retrieved from the Internet: <URL: http://www.eonstreams.com/Services.htm>.

"Eonstreams, what we do . . . ," Eonstreams, Inc., 2004, 1 page, [online] [retrieved on Apr. 7, 2005] Retrieved from the Internet: <URL: http://www.eonstreams.com/Samples.htm>.

"Eonstreams, Who we are . . . ," Eonstreams, Inc., 2006, 1 page, [online] [retrieved on Apr. 28, 2006] Retrieved from the Internet: <URL: http://www.eonstreams.com/About_Us.htm>.

"Eonstreams, WIVK Knoxville, TN . . . ," Eonstreams, Inc., 2004, 1 page, [online] [retrieved on Apr. 7, 2005] Retrieved from the Internet: <URL: http://www.eonstreams.com/SamplesDemosWIVK.htm>.

"Eonstreams, Z100, NY . . . ," Eonstreams, Inc., 2004, 1 page, [online] [retrieved on Apr. 7, 2005] Retrieved from the Internet: <URL: http://www.eonstreams.com/SamplesDemosZ100.htm>.

"MediaSpan Online Services Partners With Eonstreams," EContentMag.com, Feb. 3, 2006, 3 pages, [online] [retrieved on Apr. 28, 2006] Retrieved from the Internet: <URL: http://www.econtentmag.com/Articles/ArticleReader.aspx?ArticleID=15031>.

"NAB2005—The World's Largest Electronic Media Show," National Association of Broadcasters, 2005, 2 pages, [online] [retrieved on Apr. 28, 2006] Retrieved from the Internet: <URL: http://www.nabshow.com/exhibitors/NAB2005/company.asp?id=11150>.

"Streaming Audio and Video Development and Media Hosting Solutions," VitalStream, Inc., 2000-2006, 1 page, [online] [retrieved on May 22, 2006] Retrieved from the Internet: <URL: http://www.vitalstream.com/about/index.html.>.

"VitalStream Acquires Eonstreams to Provide Comprehensive Online Advertising Solutions," VitalStream, Press Release, May 22, 2006, 3 pages, [online] [retrieved on May 22, 2006] Retrieved from the Internet: <URL: www.vitalstream.com/news/release-05-22-06.html>.

PCT International Search Report, PCT/US02/04769, Jul. 23, 2002, 2 pages.

PCT International Search Report, PCT/US02/19983, Oct. 18, 2002, 1 page.

16-Bit Stereo Brochure, Spectrum Signal Processing, Inc. Date unknown.

Aaddzz Brokers Web Ad Space Sales Between Advertisers & Publishers, "The Best Way to Buy and Sell Web Advertising Space," 1997. [online] Retrieved from the Internet: <URL:http://www.aaddzz.com>.

Accipiter, Inc., "Accipiter announces Accipiter AdManager, a breakthrough in Internet advertising and marketing" [Online], [retrieved on Apr. 1, 2008]. Retrieved from the Internet <URL: http://web.archive.org/web/19980201092220/www.accipiter.com/press/releases/pr_adman10.htm> Sep. 9, 1996.

Adforce, User Guide Version 2.6, "A Complete Guide to AdForce," 1998.

AdKnowledge Corporate Information, Company Overview, [online retrieved Aug. 16, 2007] Retrieved from <URL:http://web.archive.org/web/19990128143110/www.adknowledge.com/corporate/index.html>.
Adknowledge Customers, i-traffic, [Online], [retrieved Aug. 16, 2007] Retrieved from the Internet: <URLhttp://web.archive.org/web/19990503093107/www.adknowledge.com/aksystem/profile__itraffic.html>.
AdKnowledge Inc., "Automates the targeting and serving of web advertising campaigns," [Online], [retrieved on Aug. 16, 2007] Retrieved from the Internet: <URL:http://web.archive.org/web/19990222023416/vvww.adknowledge.com/aksystem/smartbanner.html>.
AdKnowledge Inc., "Comprehensive Planning," [Online], [retrieved on Aug. 16, 2007] Retrieved from the Internet: <URL:http://web.archive.org/web/19990221144457/www.adknowledge.com/aksystem/planner.html >.
AdKnowledge Inc., "The AdKnowledge System," [Online], [retrieved on Aug. 16, 2007] Retrieved from the Internet: <URL:http://web.archive.org/web/19990221115917/www.adknowledge.com/aksystem/index.html>.
AdKnowledge Inc., Corporate Information "AdKnowledge Events," [Online], [retrieved on Aug. 16, 2007] Retrieved from the Internet: <URL:http://web.archive.org/web/20000511005235/www.adknowledge.com/whatsnew/events.html >.
Adknowledge Primary Services, Customer Reference Guide, pp. 1-90, 2000.
AdKnowledge, Inc., Campaign Manager, "Streamlines buying and trafficking while saving time and money," [Online], [retrieved Aug. 16, 2007] Retrieved from the internet: <URL:http://web.archive.org/web/19990221080152/www.adknowledge.com/aksystem/campaign.html>.
Adwiz by NEC, "The Artificial Intelligence Solution for Advertisement Targeting," [Online], [retrieved Apr. 1, 2008] Retrieved from the Internet: <URL:http://web.archive.org/web/20000816042946/http://wwvv.ccrl.com/adwizi/>.
Blinkx, "Video Search Engine - Blinkx," [Online], [retrieved Apr. 16, 2008]. Retrieved from the Internet: <URL:http://blinkx.com/>.
DSP-32C Brochure, Ariel Corporation, 433 River Road, Highland Park, NJ 08904, (201) 249-2900, May 1, 1989.
DSP56001 Brochure, Spectrum Signal Processing, Inc., (508) 366-7355. Date unknown.
Engage Technologies, Accipiter, "AdManager Frequently Asked Questions." [Online], [retrieved Apr. 1, 2008]. Retrieved from the Internet <URL:http://web.archive.org/web/19990208222457/wvvw.accipiter.com/products/admanager/adm__faq.htm> Feb. 8, 1999.
Engage Technologies, Accipiter, "Questions and Answers about using Accipiter AdManager with Engage Precision Profiles" [Online], [retrieved on Apr. 1, 2008]. Retrieved from the Internet <URL:http://web.archive.org/web/19990209022600/www.accipiter.com/products/admanager/adm__profilesfaq.htm> Feb. 9, 1999.
European Patent Office: Supplementary European Search Report for International Application No. PCT/US2005/016405 (6 pages). Munich, Germany. Sep. 18, 2008.
EveryZing, Inc., "Video SEO and Multimedia Search Solutions," [Online], [retrieved Apr. 16, 2008], Retrieved from the Internet: <URL:http://everyzing.com/>.
IEEE Intelligent Systems, New Products, "Tell your computer where to go," United Kingdom, Jan./Feb. 1998.
Information Access Technologies, Inc., "Aaddzz Ad Sizes," [Online], [retrieved Apr. 15, 2008] Retrieved from the Internet: <URL:http://web.archive.org/web/19980130092848/www.aaddzz.com/pages/sizes>.
Information Access Technologies, Inc., Aaddzz Ads, Spaces, & Places [Online], [retrieved Apr. 14, 2008] Retrieved from the Internet: <URL:http://web.archive.org/web/19980130092810/www.aaddzz,com/pages/b-adspacesplaces>.
Information Access Technologies, Inc., "Aaddzz Advanced Topics," [Online], [retrieved Apr. 15, 2008] Retrieved from the Internet: <URL:http://web.archive.org/web/19980130092908/www.aaddzz.com/pages/advanced >.
Information Access Technologies, Inc., "Aaddzz Advertisers," [Online], [retrieved Apr. 15, 2008] Retrieved from the Internet: <URL:http://web.archive.org/web/19980130092804/www.aaddzz.com/pages/b-advertise>.
Information Access Technologies, Inc., "Aaddzz Buying Ad Space with Aaddzz," [Online], [retrieved Apr. 15, 2008] Retrieved from the Internet: <URL:http://web.archive.org/web/19980130092822/www.aaddzz.com/pages/advertising>.
Information Access Technologies, Inc., "Aaddzz Fees and Payments," [Online], [retrieved Apr. 15, 2008] Retrieved from the Internet: <URL:http://web.archive.org/web/19980130092836/www.aaddzz.com/pages/pricing>.
Information Access Technologies, Inc., "Aaddzz Free Access Reports," [Online], [retrieved Apr. 15, 2008] Retrieved from the Internet: <URL:http://web.archive.org/web/19980130092902/www.aaddzz.com/pages/reports>.
Information Access Technologies, Inc., "Aaddzz Frequently Asked Questions," [Online], [retrieved Apr. 15, 2008] Retrieved from the Internet: <URL:http://web.archive.org/web/19980130092914/www.aaddzz.com/pages/faq>.
Information Access Technologies, Inc., "Aaddzz Home p.," [Online], [retrieved Apr. 15, 2008] Retrieved from the Internet: <URL:http://www.aaddzz.com/letter.html>.
Information Access Technologies, Inc., "Aaddzz Publishers," [Online], [retrieved Apr. 15, 2008] Retrieved from the Internet: <URL:http://web.archive.org/web/19980130092758/www.aaddzz.com/pages/bpublish>.
Information Access Technologies, Inc., "Aaddzz Ratings," [Online], [retrieved Apr. 15, 2008] Retrieved from the Internet: <URL:http://web.archive.org/web/19980130092842/www.aaddzz.com/pages/ratings>.
Information Access Technologies, Inc., "Aaddzz Real-Time Reporting & Statements," [Online], [retrieved Apr. 15, 2008] Retrieved from the Internet: <URL:http://web.archive.org/web/19980130092816/www.aaddzz.com/pages/b-realtime>.
Information Access Technologies, Inc., "Aaddzz Selling Ad Space With Aaddzz," [Online], [retrieved Apr. 15, 2008] Retrieved from the Internet: <URL:http://web.archive.org/web/19980130092829/www.aaddzz.com/pages/selling>.
Information Access Technologies, Inc., "Introduction to Aaddzz," [Online], [retrieved Apr. 15, 2008] Retrieved from the Internet: <URL:http://web.archive.org/web/19980130092752/www.aaddzz.com/pages/b-intro>.
Information Access Technologies, Inc., Aaddzz Highlights: The Maximum Performance Ad Network, "Aaddzz brokers Web ad space between advertisers & publishers," 1997 [Online], [retrieved Apr. 15, 2008] Retrieved from the Internet: <URL:http://web.archive.org/web/19980130092746/www.aaddzz.com/pages/b-highlights>.
Inside Online Video, "Blinkx to Contextualize Video Ads Through Speech Recognition," Jun. 22, 2007 [Online], [retrieved Apr. 16, 2008] Retrieved from the Internet: <URL:http://www.insideonlinevideo.com/2007/06/22/blinkx-to-contextualize-video-ads-through-speech-recognition/>.
International Search Report and the Written Opinioin of the International Searching Authority, or the Declaration; PCT/US2006/047944, dated Nov. 6, 2008.
International Search Report and the Written Opinion of the Int'l Searching Authority, or the Declaration. Int'l application No. PCT/US 06/47944, form PCT/ISA/220 dated Apr. 24, 2008.
International search report and written opinion in Application No. PCT/US2008/059898, dated Aug. 14, 2008.
International Search Report and Written Opinion, PCT International Patent Application No. PCT/US06/09797 dated Aug. 23, 2007.
International Search Report and Written Opinion, PCT US06-09349 dated Jun. 9, 2008.
International Search Report and Written Opinion, PCT/US06/09401 dated Sep. 22, 2006.
International Search Report and Written Opinion, PCT/US06/19096 dated Apr. 30, 2007, 7 pages.
International Search Report and Written Opinion, PCT/US06/28483 dated Jul. 18, 2007.
International search report dated Feb. 24, 2009 for PCT Application No. US2008/60169.

International search report dated Sep. 16, 2008 for PCT Application No. US2008/60088.
International search report dated Feb. 18, 2009 for PCT Application No. US2008/60175.
International Search Report, dated Feb. 12, 2008 for PCT/US2007/079088.
International search reported dated Sep. 26, 2008 for PCT Application No. US2008/60024.
International Searching Authority Written Opinion, dated Feb. 12, 2008 for PCT/US2007/079088.
Kumar, Shreyas, Patent Examination for Australian Patent Application No. 2006227730, in Examination Report mailed May 22, 2009.
Langheinrich, M., et al., "Unintrusive Customization Techniques for Web Advertising" NEC Corporation, C&C Media Research Laboratories. Japan [Online], [retrieved on Apr. 1, 2008]. Retrieved from the Internet <URL:http://web.archive.org/web/20000819020800/www.ccrl.corn/adwiz/adwiz-www8.html>.
MM-96 Brochure, Ariel Corporation, 1990.
NEC Corporation, "ADWIZ Intelligent Advertisement Targeting," 1998.
NEC Corporation, ADWIZ White Paper, "Taking Online Ad Targeting to the Next Level," [Online], [retrieved on Apr. 15, 2008] Retrieved from the Internet: <URL:http://web.archive.org/web/20010619222015/www.ccrl.com/adwiz/whitepaper.html>.
NEC Corporation, NEC: Press Release "NEC announces Adwiz, an Artificial Intelligence Solution for Advertisement Targeting Software on the World Wide Web," Jan. 8, 1999.
Oki Real Voice Products Brochure, Oh Semiconductors. Date unknown.
ScanScout, "ScanScout in the News," [Online], [retrieved Apr. 16, 2008]. Retrieved from the Internet: <URL:http://scanscout.com/>.
SX-10 Brochure, Antex Electronics, Mar. 1989.
VP600 Brochure, Antex Electronics, 16100 Figueroa St, Gardena, CA 90248 (213) 532- 3092. Date unknown.
VP620E Brochure, Antex Electronics. 16100 Figueroa St, Gardena, CA 90248 (213) 532-3092. Date unknown.
VP625 Brochure, Antex Electronics, 16100 Figueroa St, Gardena, CA 90248 (213) 532- 3092. Date unknown.
VP635 Brochure, 16100 Figueroa St, Gardena, CA 90248 (213) 532-3092. Date unknown.
Windows XP Media Center Edition 2004 Review. Available at http://www.winsupersite.com/reviews/windowsxp_mce2004.asp Sep. 30, 2003. Accessed Jan. 12, 2009.
Zeff, R. and Aronson, B., "Advertising on the Internet" second edition, pp. 1-436 (1999).

* cited by examiner

DYNAMIC CREATION, SELECTION, AND SCHEDULING OF RADIO FREQUENCY COMMUNICATIONS

CROSS REFERENCE TO RELATED APPLICATIONS

This application is related to U.S. provisional application No. 60/351,935 filed Jan. 24, 2002, and PCT application PCT/US2002/04769 filed Feb. 14, 2002, incorporated herein by reference in their entirety.

BACKGROUND OF THE INVENTION

1. Field of the Invention

The field of the invention is radio frequency communications.

2. Description of the Background

Transmission of data via radio signals is an effective means of communication to a variety of devices located within range of the signal. An advertiser or other provider of the data (including content) may pre-select a radio frequency carrier type (e.g. FM sub-carrier, AM sub-carrier, Cellular etc. . . . ), a broadcasting station (e.g. KIIS FM), and/or a frequency over which the data will be broadcast (e.g. 102.7 MHz 57 kHz RBDS) based on the geographic location of the target audience. The particular frequency may be chosen because of its popularity with the target audience, its spectrum availability, the type or device that will receive the signals, and importantly because its signals will cover (i.e. reach) the targeted audience.

Covering the target audience is deemed essential, and since many applications of radio frequency (RF) communication target an audience existing within a relatively small geographic area, often coverage is not a problem. For example, it is common to broadcast music or news over a pre-selected frequency to all areas of an office building. Pre-selection of the frequency and pre-tuning of the receivers to that frequency is a relatively easy process. Another example of an RF communication within a relatively small area is a radio controlled car that is set to receive signals broadcast over a pre-selected frequency. Yet another example is taught by U.S. Pat. No. 6,298,218 to Lowe et al. (October 2001). The '218 patent targets audiences within a few feet of the transmitting device. This is exemplified by an athletic club environment in which a user device receives different broadcasts on different frequencies depending on his proximity to specific pieces of gym equipment having transmitters. Thus, those applications that target audiences over a relatively small area typically work well with pre-selection of the frequency and the station. Coverage becomes an issue and complications arise, however, when the target audience is spread over an area that encompasses more than one frequency, station, and/or band. These complications are due in part to the necessity to pre-select many, perhaps hundreds or thousands, of frequencies and stations in order to cover the entire target audience. Thus, pre-selection of frequencies becomes extremely burdensome when a wide spread audience has been targeted.

The need to employ several stations simultaneously is addressed by U.S. Pat. No. 4,517,562 to Martinez (May 1985), however the '562 patent still does not solve or even recognize problems related to the difficulty of scheduling and coordinating communications over a wide spread area. These problems are exacerbated by competition for available RF spectrum and perhaps the distance between a data provider and a data recipient.

There is a need for systems and methods which facilitate use of radio signals to communicate to devices that may be spread over a relatively large area.

BRIEF SUMMARY OF THE INVENTION

The present invention includes systems and methods of developing and delivering visual/audio radio frequency campaigns. A managing node receives broadcast specific information and broadcast non-specific information, and the managing node matches at least one item of broadcast non-specific information with an item of broadcast specific information as part of the development of a visual/audio campaign that is delivered to a remote device preferably via a sub-carrier frequency.

Another aspect includes a system for developing and delivering a visual/audio campaign to a device having a radio wave receiver in which a managing node is programmed to: receive broadcast specific information from a plurality of radio stations; automatically develop the visual/audio campaign as a function of the broadcast specific information and broadcast non-specific information; and deliver the visual/audio campaign to the device using radio waves having a sub-carrier frequency.

A further aspect includes a system comprising a remote device having a display area that is within line of sight of an information user that requests a visual/audio campaign from the remote device. A plurality of radio stations are responsive to a request for broadcast specific information, and a managing node is responsive to a request for visual/audio information, the response based on either or both of the broadcast specific information and broadcast non-specific information. The visual/audio campaign is broadcast to the remote device via a sub-carrier frequency.

It should be appreciated that the inventive subject matter is especially useful for providing a visual campaign to a car stereo system.

Various objects, features, aspects and advantages of the present invention will become more apparent from the following detailed description of preferred embodiments of the invention, along with the accompanying drawings in which like numerals represent like components.

DETAILED DESCRIPTION OF THE INVENTION

Figure 1:
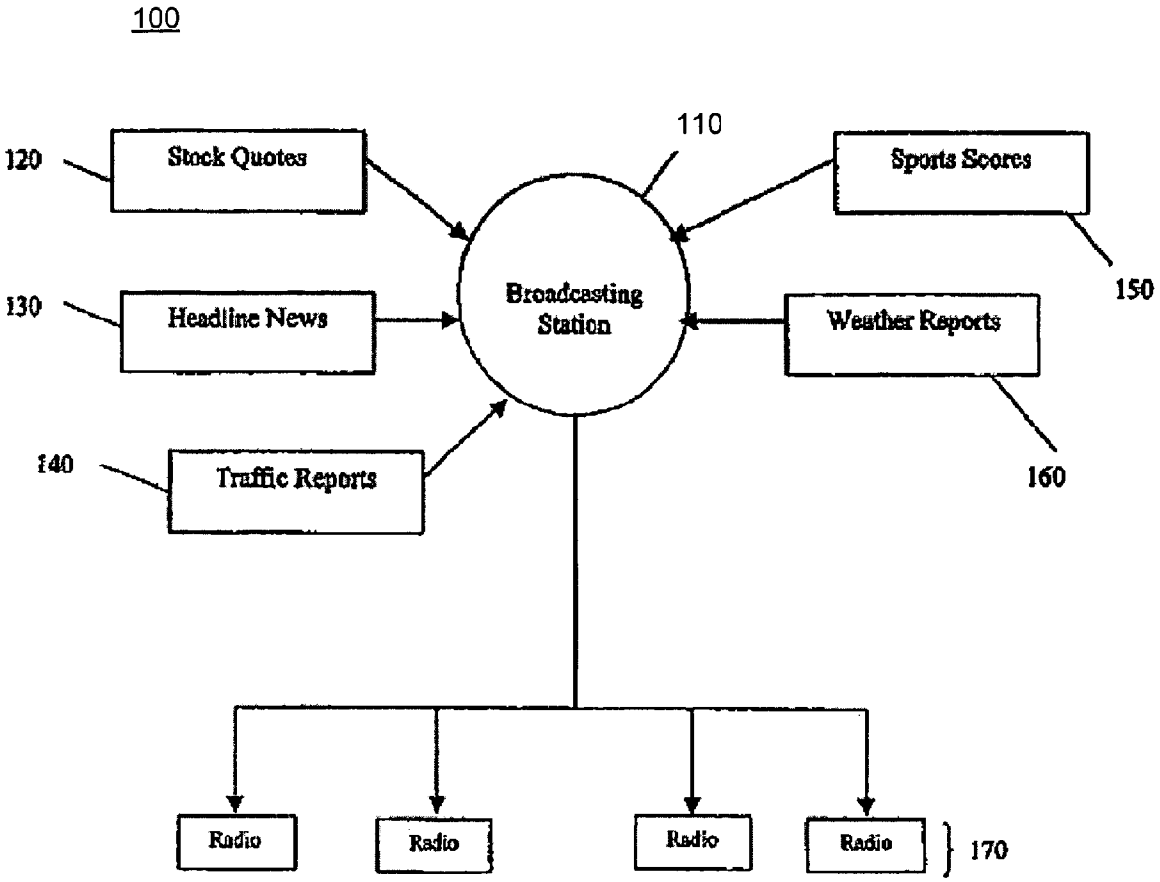
FIG. 1 Prior Art
FIG. 1 is a schematic of a prior art system of delivering visual data to a radio.

Referring first to FIG. 1, a prior art system 100 includes a broadcasting station 110, various types of information 120-160, and radios 170. It is known for a radio station to deliver visual information in the form of stock quotes 120, headline news 130, traffic reports 140, sports scores 150, and weather reports 160 to radios 170.

Figure 2:
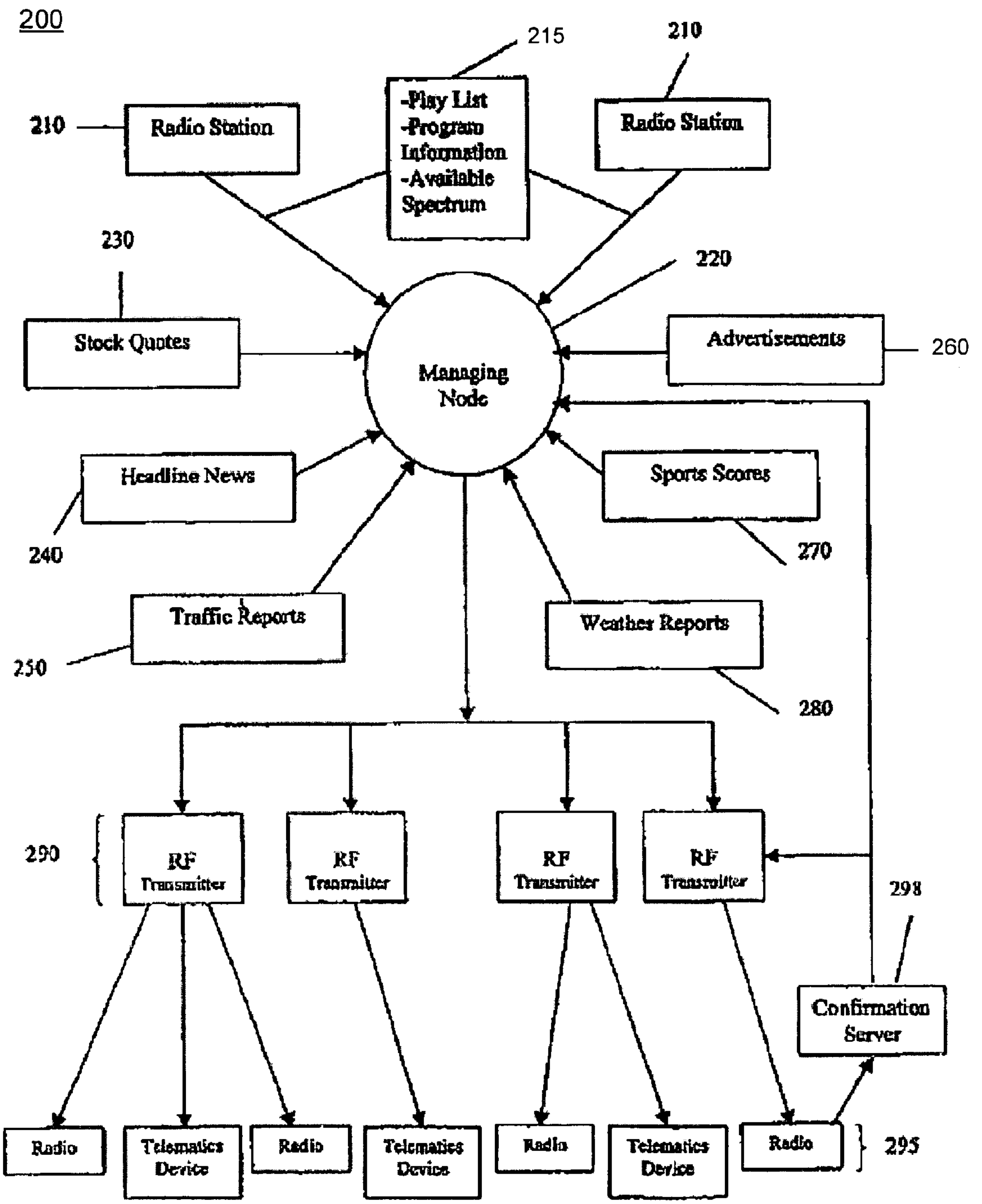
FIG. 2 is a schematic of an embodiment in which broadcast specific and broadcast non-specific information is received by a managing node.

In FIG. 2, a system 200 generally includes a plurality of radio stations 210 that deliver broadcast specific information 215 to a managing node 220. A managing node 220 also may receive broadcast non-specific information such as stock quotes 230, headline news 240, traffic reports 250, advertisements 260, sports scores 270, and weather reports 280. Broadcast specific information and broadcast non-specific information are typically part of a visual campaign (not shown) that is delivered to an RF transmitter 290 for subsequent broadcast to a device 295 such as a car radio or mobile telematics device.

As defined herein, a visual/audio campaign is comprised of information (i.e. data) that can either be optically (visually) sensed by the human eye or audibly sensed by the human ear. A visual/audio campaign may include graphics, audio, text, symbols, pictures, and images that are stored electronically, and therefore visual/audio information may be temporarily not susceptible to being optically or audibly sensed. Thus, data traveling by radio waves may be part of a visual/audio campaign even though the data may not be viewable or audibly discernable in its present state. A visual/audio campaign typically comprises content data and schedule related data such as delivery times, broadcast frequencies, RF transmitter locations. Additionally, a visual/audio campaign may be formatted to comply with known technologies such as RDS (radio data service), RBDS (radio broadcast data service), and DARC (Data Radio Channel), and thus a visual campaign may include the data associated to the following fields: Program Identification (PD; Program Service (PS) name; Automatic Frequency Switch (AF) list; Traffic Programme (TP) identification; Traffic Announcement (TA) signal; Program Type Name (PTYN); Radio Text (RT); Traffic Message Channel (TMC); and Programme Type (PTY). While a visual/audio campaign may include at least one item of broadcast specific information and/or broadcast non-specific information, it should be pointed out that this is not a requirement. Thus, the subject of visual/audio campaign may be an advertisement that does not comprise any broadcast specific information.

Radio stations 210 are generally entities that transmit information to common radios and other devices by radio waves (e.g. KIIS FM, KBIG, WNEW and so on). It should be appreciated, however, that the concept of a radio station should not be limited except to the extent that a station can send broadcast specific information 215 to a managing node 220.

Broadcast specific information 215 is information related to a broadcast of radio wave information. For example, broadcast specific information includes a play list (e.g. names or content of songs and associated times and dates that the songs will be played), program information (e.g. a names or content of programs, segments, or spots and associated times and dates of broadcast), available spectrum (e.g. available frequency for delivery of a visual campaign), advertisement times slots, content of advertisements, physical location of radio station transmitter, and the coverage area of a radio station broadcast. Preferably broadcast specific information 215 is sent to a managing node 220 via the Internet, but other paths and modes of transportation may be appropriate including non-electronic modes such as US mail.

Broadcast non-specific information 230-280 is defined in the negative as information received by the managing node that is not broadcast specific information. Broadcast nonspecific information advantageously enters a system as a result of a communication between a source (not shown) and a managing node 220, and this communication is likely an asynchronous communication of digital data over the Internet. It is contemplated that much of the broadcast non-specific information will come from news services such as AP and UPI, however the source of broadcast non-specific information is not a limitation to the overall inventive concept.

A managing node 220 generally consists of a plurality of servers that are preferably Web-based i.e., coupled to the Internet) and centralized, but may even be distributed. Servers, including RAID drives, may be geographically distributed and mirrored.

Whether a device classifies as a managing node 220 generally depends upon functionality. Among the functions of a managing node 220 are scheduling delivery of visual campaigns, selecting frequencies, selecting RF transmitters, encoding data to comply with appropriate protocols and technologies, targeting devices (e.g. by serial number, lot number, location, demographic information; psychographic information, meta data parameter), confirmation and audit (including 3rd party audit) of actual RF delivery through a feedback loop, providing detailed reporting, dynamically pricing based on availability or other criteria (e.g. Auctions); interfacing applications for 3rd party software integration, and maintaining a subscriber (source) and consumer (remote device user) web interface. A managing node 220 is also responsible for partnering with market leaders (e.g. in the sale of electronics and broadcast of RF signals) and receiving, maintaining and matching broadcast specific and broadcast non-specific information from radio stations. Since scheduling of broadcasts and selecting of frequencies are functions of a managing node 220, a device scheduling broadcasts or selecting frequencies is by definition a managing node regardless of other factors such as location. For example, a device that selects a frequency at a regional broadcast station is a managing node 220.

RF transmitters 290 are preferably operated by the radio stations 210 that have transmitted broadcast specific information 215 to the managing node 220. In other less preferred embodiments, RF transmitters may be independent from radio stations and may be employed simply to transmit and optionally encode visual campaigns. A visual/audio campaign may be encoded for radio broadcast by the managing node 220 or some other entity including the RF transmitters. It is contemplated that such transmitters are those capable of broadcasting radio signals within AM, FM, TV (NTSC, DTV in N. America, PAL and DVB in some other countries), Cellular/PCS, and Satellite bands, and it is anticipated that both primary and sub-carrier channels will be utilized to transmit data.

A preferred device 295 is a car stereo that is RDBS, RDS, and/or DARC enabled. The device may also be enabled with other appropriate technology that allows receipt of a visual/audio campaign broadcast over radio waves. In addition to a car stereo, the following is a non-inclusive list of contemplated devices: mobile telematics device, PDA, cell phone, GPS device, mass transit displays, mall displays (e.g. kiosks), airport displays, entertainment venue displays, sporting event displays, street furniture (e.g. benches at a bus stop), video games, TVs, and mobile audio devices (e.g. a walkman, an MP3 player, and so on).

With respect to a device 295, it is generally contemplated that a display (not shown) will be coupled to the device 295. An example of a display is an LCD on the front of a radio. The size of the display is not to be construed as a limitation herein, however, a preferred display is only about a half inch high by 2 inches long. As such, information that is displayed on the display (i.e. the visual/audio campaign) may be scrolled or paged over the display area. It is further contemplated that a visual/audio campaign may be used to feed a GPS or other supplemental system. Consider a visual/audio campaign that includes traffic information. The traffic information may optionally be used to feed a GPS system that will consider the traffic information and plan a detour. An expansion on this concept includes transportation department information related to road closures.

In a preferred class of embodiments, a user has the option to store visual/audio campaigns and or portions of the campaigns. The option to store may be actuated by pressing a button on the steering wheel or by other appropriate means such as a voice command of "store". This capability is especially useful for a driver of an automobile that wants to retain campaign information.

A device 295 may have a button or some other means of enable/disabling receipt of a visual/audio campaign. Additionally, a visual/audio campaign may be the subject of a subscription requiring advance payment, and as such an access parameter (not shown) may be used to control whether a device 295 receives a broadcast communication. In embodiments that utilize an access parameter, a user may submit a request to set the access parameter, which generally resides on a remote device. Such a request is typically submitted to a managing node 220. Thus, a broadcast communication may include a unique identifier (e.g. serial number, VIN) of a remote device 295, and the remote device 295 may receive the communication as a function of a value of the access parameter. While this example targets a single remote device, no requirement should be inferred that access parameters operate with only a single remote device, and in fact communications may target multiple serial numbers or lot numbers.

Another aspect includes broadcasts that may be overlapped to increase the probability of a successful communication. For example, a single device may be within range of more than one RF transmitter 295, and therefore, each transmitter within range may issue a "duplicate" transmission. This may be especially helpful should a transmitter 295 go down or have problems with interference.

Information confirming an RF communication may be tracked by a confirmation server 298 and may include an acknowledgement of receipt, a date and time received, as well as other useful information in response to the device's receipt of RF data. Failure of a communication may indicate that a remote device is inoperable or no longer within the geographical range of an RF transmitter.

FIG. 2 may be readily understood by reference to a specific example. KIIS, a southern California radio station, sends a play list to a managing node. Included in the play list is a song by Brittany Spears. The managing node compares the string "Brittany Spears" with broadcast non-specific information. Perhaps a match occurs with an item in a file containing concert dates. The managing node takes the matching information and creates a visual/audio campaign comprising a message of "See Brittany Spears at Staples on June 22". This message becomes part of the visual campaign that is scheduled by the managing node and delivered to a plurality of RF transmitters in accordance with delivery schedules developed by the managing node. The RF transmitters deliver the campaign via a subcarrier frequency to devices. In another embodiment, the visual/audio campaign may comprise audible data that says, "Hi, this is Brittany. Thanks for listening to my song".

In another example, a driver in his car has enabled RBDS on his in-dash stereo. Radio stations, responding to requests for broadcast specific information send such information to a managing node. In this example, radio station A may send the following broadcast specific information "stock report 10:30 am", and radio station B may send the following broadcast specific information "stock report 11:25 am". Using the broadcast specific information, the managing node may match broadcast non-specific information of "Microsoft up 6 points." The managing node may then develop a visual/audio campaign in which the message "Microsoft up 6" is displayed at 10:30 am for devices tuned to station A, and at 11:25 am for devices tuned to station B. Transmission of the visual/audio campaign may utilize a sub-carrier frequency and will preferably occur while information is being broadcast on the primary frequency.

Thus, specific embodiments and applications of dynamic creation, selection, and scheduling of radio frequency communications have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of developing a visual/audio campaign for delivery to a device having a radio wave receiver, comprising:

receiving, at a managing node, broadcast specific information including real-time information from a plurality of radio stations, each radio station having a respective broadcast frequency, the managing node being separate and remotely located from the device;

receiving, at the managing node, broadcast non-specific information;

creating, at the managing node, the visual/audio campaign including a message for presenting on the device by dynamically matching an item of broadcast non-specific information received from a source with an item of broadcast specific information received from one or more radio stations of the plurality of radio stations, wherein the message is based on the matched item of broadcast specific information and the item of broadcast non-specific information;

including, by the managing node, in the visual/audio campaign scheduling data including a selection of broadcast frequencies from a plurality of possible broadcast frequencies of the plurality of radio stations;

scheduling, by the managing node, a delivery of the visual/audio campaign on the frequencies selected by the managing node based at least in part on the scheduling data; and delivering the visual/audio campaign for transmission to the device via radio waves at the selected frequencies, wherein the message is presented on the device upon delivering.

2. The method of claim 1, wherein the broadcast specific information comprises a title of a song and an artist.

3. The method of claim 2, wherein the broadcast non-specific information comprises a concert date for the artist.

4. The method of claim 1, wherein the broadcast specific information comprises a financial segment.

5. The method of claim 4, wherein the broadcast non-specific information comprises a stock quote.

6. The method of claim 1, wherein the step of matching is performed automatically.

7. The method of claim 1, wherein the visual/audio campaign comprises an advertisement that is motivated by at least one of the broadcast specific information and the broadcast non-specific information.

8. The method of claim 1, wherein the visual/audio campaign further includes graphics.

9. The method of claim 1, further comprising the step of delivering the visual/audio campaign to a plurality of RE transmitters.

10. The method of claim 1, wherein the step of delivering the visual/audio campaign further comprises targeting a specific vehicle.

11. The method of claim 1, wherein at least part of the visual/audio campaign comprises traffic information and the traffic information is delivered to a navigation system.

12. The method of claim 1, further comprising the step of saving at least a portion of the visual/audio campaign on a permanent storage medium.

13. The method of claim 1, wherein the device comprises a telematics device.

14. The method of claim 1, wherein the device comprises an RDS enabled receiver.

15. The method of claim 1, wherein the device comprises an RBDS enabled receiver.

16. The method of claim 1, wherein the device comprises a DARC enabled receiver.

17. The method of claim 1, wherein the radio waves have a frequency of an FM sub-carrier band.

18. The method of claim 1, further comprising the step of displaying at least a portion of the visual/audio campaign on the device.

19. The method of claim 18, wherein the step of displaying further comprises scrolling the portion of the visual/audio campaign.

20. A managing node for developing and delivering a visual/audio campaign to a device having a radio wave receiver, the device being remotely located from the managing node, the managing node comprising:

means for receiving broadcast specific information including real-time information from a plurality of radio stations, each radio station having a respective broadcast frequency;

means for receiving broadcast non-specific information from a source;

means for automatically developing the visual/audio campaign including a message for presenting on the device by dynamically matching the broadcast specific information and broadcast non-specific information;

means for including, in the visual/audio campaign, scheduling data including a selection of broadcast frequencies from a plurality of possible broadcast frequencies of the plurality of radio stations;

means for scheduling the visual/audio campaign for delivery on selected frequencies based at least in part on the scheduling data; and means for delivering the visual/audio campaign for transmission to the device using radio waves having a sub-carrier frequency.

21. The node of claim 20, wherein the broadcast specific information comprises a geographic footprint associated with the radio station's coverage.

22. The node of claim 20, wherein the broadcast specific information comprises an available bandwidth.

23. The node of claim 20, wherein the broadcast non-specific information comprises an advertisement.

* * * * *

UNITED STATES PATENT AND TRADEMARK OFFICE

CERTIFICATE OF CORRECTION

PATENT NO. : 7,751,804 B2
APPLICATION NO. : 10/898011
DATED : July 6, 2010
INVENTOR(S) : R. Steelberg et al.

It is certified that error appears in the above-identified patent and that said Letters Patent is hereby corrected as shown below:

In Column 7, line 2 (Claim 9), please replace “RE” with --RF--.

Signed and Sealed this

Second Day of November, 2010

David J. Kappos
*Director of the United States Patent and Trademark Office*